United States Patent [19]

Becker

[11] Patent Number: 4,755,127
[45] Date of Patent: Jul. 5, 1988

[54] APPARATUS FOR REGULATING THE OPERATION OF A PLANT FOR THE MAKING OF EXTRUDED PRODUCTS

[76] Inventor: Bernd Becker, Auf dem Kamm 45, D-6746 Hauenstein, Fed. Rep. of Germany

[21] Appl. No.: 934,676

[22] Filed: Nov. 25, 1986

[30] Foreign Application Priority Data

Nov. 26, 1985 [DE] Fed. Rep. of Germany ....... 3541680

[51] Int. Cl.⁴ .............................................. B29C 47/92
[52] U.S. Cl. ..................................... 425/140; 250/339; 264/40.2; 264/40.4; 356/51; 425/145
[58] Field of Search ..................... 425/140, 145, 147; 264/40.2, 40.4; 356/51, 239, 73.1; 250/339, 341

[56] References Cited

U.S. PATENT DOCUMENTS

| | | | |
|---|---|---|---|
| 3,531,827 | 10/1970 | Dragonette | 425/140 |
| 3,813,200 | 5/1974 | Gergely | 425/140 |
| 3,989,779 | 11/1976 | Brunnhofer | 264/40.2 |
| 4,022,557 | 5/1977 | Johnson | 425/140 X |
| 4,087,499 | 5/1978 | Bayonnet | 264/40.4 X |
| 4,208,126 | 6/1980 | Cheo et al. | 356/51 |
| 4,325,897 | 4/1982 | Zerle et al. | 425/140 X |
| 4,363,966 | 12/1982 | Cheo | 356/239 X |
| 4,402,656 | 9/1983 | Schott, Jr. | 264/40.2 X |

FOREIGN PATENT DOCUMENTS

| | | | |
|---|---|---|---|
| 2433242 | 1/1976 | Fed. Rep. of Germany | 425/140 |
| 3234126 | 3/1984 | Fed. Rep. of Germany | 425/140 |
| 110907 | 7/1982 | Japan | 264/40.2 |

Primary Examiner—Richard L. Chiesa
Attorney, Agent, or Firm—Peter K. Kontler

[57] ABSTRACT

The apparatus has a measuring head (34) for contact-free optical monitoring of a swelling (A) of material immediately behind the extruder nozzle (22) or a pileup (32) of material ahead of the calibrating tool (26) of the plant. The measuring head (34) has spaced-apart confronting light emitting and light receiving surfaces (52) and (54). Each of these surfaces is adjacent the ends of a plurality of light conducting elements which extend to a housing (38) for a light sender and a light detector. The light receiving surface (54) is subdivided into a plurality of fields (1-13). A first signal identifies at least one field (2-13) which is located at the level of one edge of the extruded product in the region of the swelling or pileup. A second signal denotes the position of the edge within such field (2-13). A single compensation field (1) serves to ascertain a reference value of the intensity of light.

7 Claims, 2 Drawing Sheets

APPARATUS FOR REGULATING THE OPERATION OF A PLANT FOR THE MAKING OF EXTRUDED PRODUCTS

BACKGROUND OF THE INVENTION

The invention relates to an apparatus for regulating the operation of a plant for the making of extruded products, especially synthetic plastic products or the like, which comprises an extruding tool and a calibrating tool that follows in the direction of material flow, with a measuring head for contact-free optical monitoring of a pileup of material or a swelling of material between the extrusion nozzle and the calibrating tool, the measuring head comprising spaced-apart confronting light emitting and light receiving surfaces at least the latter of which is adjacent the ends of a plurality of light conducting elements.

For the making of extruded products, one employs extruding tools for example in the form of an extruder with associated extruder nozzle. The material flow which issues from the extruding tool is advanced to a calibrating tool which determines the ultimate external shape of the extruded product. As a rule, the calibrating tool can be provided with an opening the cross-section of which corresponds substantially to that of the extruder nozzle or is somewhat smaller in order to ensure the establishment of a shaping effect. A swelling of material in the region of the orifice of the extruder nozzle and a pileup of material ahead of the calibrating tool take place in the space between the extruder nozzle and the calibrating tool.

The subject of the invention serves for optical monitoring of such swelling or such pileup for the purpose of regulating the operation of the making plant.

Downstream of the calibrating tool, there is normally provided a cooling device and a device for withdrawing the extruded product. Firstly, the development of the swelling of material or of the pileup of material ahead of the inlet to the calibrating tool can be regulated on the basis of velocity at which the extruding tool is operated; as a rule, it is possible to regulate the rotational speed of the extruder screw in a nozzle type extruder. Secondly, it is possible to influence the speed of operation of the withdrawing unit. In both instances, it is necessary to ascertain the actual extent of swelling of material or of the pileup of material ahead of the inlet of the calibrating tool and compare it with a predetermined reference value for the swelling of material or the pileup of material in order to obtain in this manner a regulating signal. German Offenlegungsschrift No. 24 33 242 discloses an apparatus for ascertaining the actual pileup of material in front of the inlet of a calibrating tool wherein a mechanical scanning of the extruded product issuing from the extruding tool takes place. German Offenlegungsschrift No. 32 34 126 proposes a contact-free optical monitoring of the pileup of material according to which an edge of the extruded product is located in the path of radiation between a light emitting surface and a light receiving surface ahead of the calibrating tool, and a measurement of absorption of light by the extruded product takes place. It was also proposed already to form a light emitting surface by a plurality of light conducting fibers which terminate at the surface and serve to convey light from a remote light source, and to further cause the ends of a plurality of light conducting fibers to extend to a light receiving surface by way of which the incident light reaches a photodetector. In this connection, the term light is intended to embrace electromagnetic radiation in the visible and neighboring ranges of the spectrum. It is preferred to utilize infrared radiation which can be detected by a photodiode with the interposition of a filter, if necessary. The light conducting fibers which are employed can constitute glass fibers.

OBJECTS AND SUMMARY OF THE INVENTION

An object of the invention is to provide an apparatus of the above outlined type which is of inexpensive design but renders it possible to accurately and rapidly ascertain the position of an edge of the extruded product in the swelling of material behind the extruder nozzle or in the pileup of material ahead of the calibrating tool.

This object is accomplished in that the light receiving surface is divided into a plurality of fields each of which is adjacent the end of at least one light conducting element, and in that the apparatus generates a first signal for identification of at least one field at the level of which an edge of the extruded product is located in the region between the extrusion nozzle and the calibrating tool, and a second signal for ascertainment of the position of the edge within such field.

The novel apparatus exhibits all advantages of contact-free optical monitoring of the swelling of material behind the extruder nozzle or of the pileup of material ahead of the calibrating tool. The novel apparatus is especially suited for ascertainment of the swelling of material immediately behind the extruder nozzle in connection with the making of extruded products from soft synthetic plastic materials, for example, soft polyvinyl chloride, which was not possible with conventional apparatus relying on actual contact with the material because one cannot rely upon calibration in connection with the making of extruded products from soft synthetic plastic materials. The monitoring preferably takes place without a mechanical influencing of the extruded product. It is not sensitive to external influences such as vibrations, dust, etc., and it allows for a sturdy and substantially maintenance-free design.

The utilization of an optical system employing light conducting elements renders it possible to place the light emitting and light receiving surfaces in immediate proximity to the swelling of material to be monitored behind the extrusion nozzle or the pileup of material immediately ahead of the calibrating tool; this minimizes the possibility of disturbing influences. The measuring head can be very small so that it fits even into small gaps between the extrusion tool and the calibrating tool. In order to avoid congestion, the light emitter and the light detector can be mounted at a distance from the swelling of material or the pileup of material. This is of advantage for reasons of temperature. In the field of extrusion of synthetic plastic materials, temperatures prevailing ahead of the calibrating tool can reach approximately 380° C. Suitable light conducting elements can readily stand such temperatures but the more temperature-sensitive light emitting and light detecting arrangements should preferably be located at a certain distance in a cooler location. The novel division of the light receiving surface into several fields each with a plurality of light conducting elements allows for a rapid, accurate detection of the position of an edge of the extruded product which is located in the region of the swelling of material or of the pileup of material. A logic yes/no signal or a digital signal can be generated to first identify the field which is in register with the edge in order to thus obtain approximate information pertaining to the extent of the swelling of material or of the pileup of material and by means of which one can rapidly eliminate pronounced fluctuations of the swelling or pileup. The plurality of ends of light conducting elements at each field renders it possible to derive a quasi analog signal for the position of the edge within the field. This renders it possible to achieve an accurate determination of the position of the edge and, preferably at substantially stable operating conditions, an accurate regulation of the swelling of material or of the pileup of material to a desired value.

The fields of the light receiving surface can have a square outline and can be immediately adjacent one another. It is preferred to provide two parallel rows of fields next to each other and staggered by one-half the length of a field. Such staggering of the fields ensures that the to-be-detected edge of the extruded product invariably registers with the central region of a field; thus, the boundaries of the fields prevent the development of gaps or blind spots in the monitoring area. Furthermore, one obtains two logic signals each of which identifies in the respective row one field which registers with the edge of the extruded product to be monitored. On the basis of these two signals, it is possible to achieve a coarse measurement of the position of the edge with the accuracy of one-half of a field.

The light receiving surface can comprise a compensation field which is preferably spaced apart from other fields, which is not located at the level of an edge of the extruded product in actual operation, and which serves to monitor a reference level of the intensity of light. With this compensation field, one can eliminate from measurement those fluctuations of the intensity of emitted and detected light which are not attributable to the swelling of material or to the pileup of material. In this manner, one can advantageously compensate for varying optical damping which develops as a result of movement or deformation of light conducting elements. Furthermore, there takes place a compensation for fluctuations of intensity of light which is emitted by the light sender as well as for deterioration of the light sender and light receiver due to aging and, last but not least, one can compensate for optical absorption of films, e.g., dust, which deposit on the light emitting and light receiving surfaces. As a result of this, one achieves a high sensitivity and an absence of the proneness to malfunction of the improved apparatus. Surprisingly, the apparatus is even capable of monitoring extruded products of light transmitting or translucent material whereby the different absorptivites of such materials in various spectral regions are accounted for by the selection of an appropriate wavelength of light during measurement.

One further takes advantage of the fact that the optical density of extruded products is more pronounced in the region of the edges. This technical advance is surprising and of pronounced nature.

The light emitting surface can have an elongated rectangular outline, and its area can equal or approximate that of the light receiving surface inclusive of the compensation field. This renders it possible to achieve a satisfactory illumination of the light receiving surface with a relatively small structural outlay.

DESCRIPTION OF THE PREFERRED EMBODIMENTS

Figure 1:
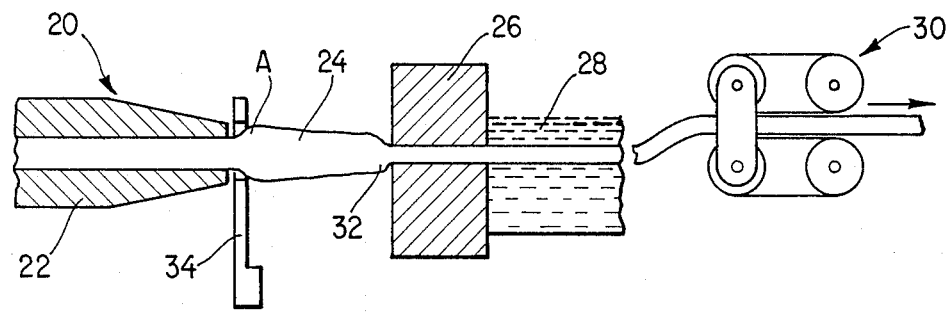
FIG. 1: a portion of a plant for the making of extruded products with a novel apparatus which monitors the swelling of material behind the extrusion nozzle.

FIG. 1 shows schematically a portion of a plant for the production of extruded profiled products from synthetic plastic material. There is shown an extruding tool 20 in the form of a nozzle-type extruder the nozzle 22 of which discharges an extruded product 24 whose shape corresponds to the orifice of the nozzle. The extruded product 24 can constitute a solid or a hollow product of desired cross-sectional outline. The extruded product 24 is calibrated in a calibrating tool 26 and thereby receives its final external dimensions. The calibrating tool 26 has an opening the configuration of which normally corresponds substantially to that of the orifice of the nozzle and the cross-sectional area of which can be somewhat smaller. The calibrating tool 26 is followed by a cooling zone 28. Further downstream, there is provided a withdrawing unit 30 which draws the extruded product from the calibrating tool 26 and normally delivers it to a severing or stacking device.

The extruded product 24 develops a swelling A of material in the path downstream of the extruder nozzle 22 and a pileup 32 of material prior to leaving path entering the calibrating tool 26. An optimum selection of material swelling A and pileup 32 can be provided for each profile; these values can be ascertained empirically and should be maintained with a relatively high degree of accuracy when the plant is in operation. This is achieved with a regulator having a measuring head 34 which can be disposed, for example, immediately behind the extruder nozzle or immediately ahead of the inlet of the calibrating tool 26. The measuring head 34 monitors optically and in contact-free manner the actually developing swelling A or the actually developing pileup 32. A corresponding measurement value is compared with a predetermined reference value, which corresponds to the desired optimum adjustment of the material swelling A or the material pileup 32, to generate a corresponding control signal. The latter serves to influence appropriate operational parameters of the apparatus in order to increase or to reduce the actual extent of the swelling A of material or the pileup 32 of material; in particular, it is possible to change the rotational speed of the extruder screw in the extruding tool 20 and/or the transporting speed of the withdrawing unit 30.

Figure 2:
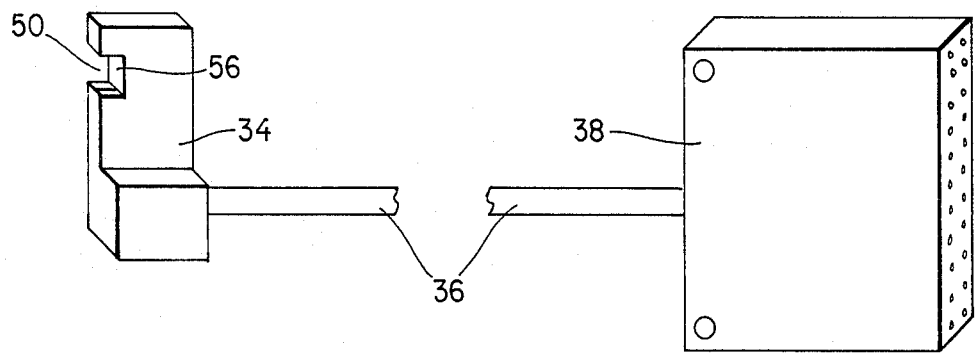
FIG. 2: a measuring head and a housing of the apparatus which are connected by a light conducting cable.

Referring to FIG. 2, the measuring head 34 is connected with a housing 38 by means of a light-conducting cable 36. The housing 38 contains a light sender and a light receiver. The term light is intended to embrace electromagnetic radiation in the visible range of the spectrum and in the neighboring spectral ranges, i.e., infrared radiation and ultraviolet radiation. Infrared radiation is preferred. Such radiation can be generated by inexpensive radiation sources, especially in the form of light emitting diodes and lasers, and inexpensive detectors, for example, in the form of photodiodes, are available. Infrared radiation can be conveyed by customary light conducting optical elements which exhibit the advantage of satisfactory thermal stability.

Figure 3:
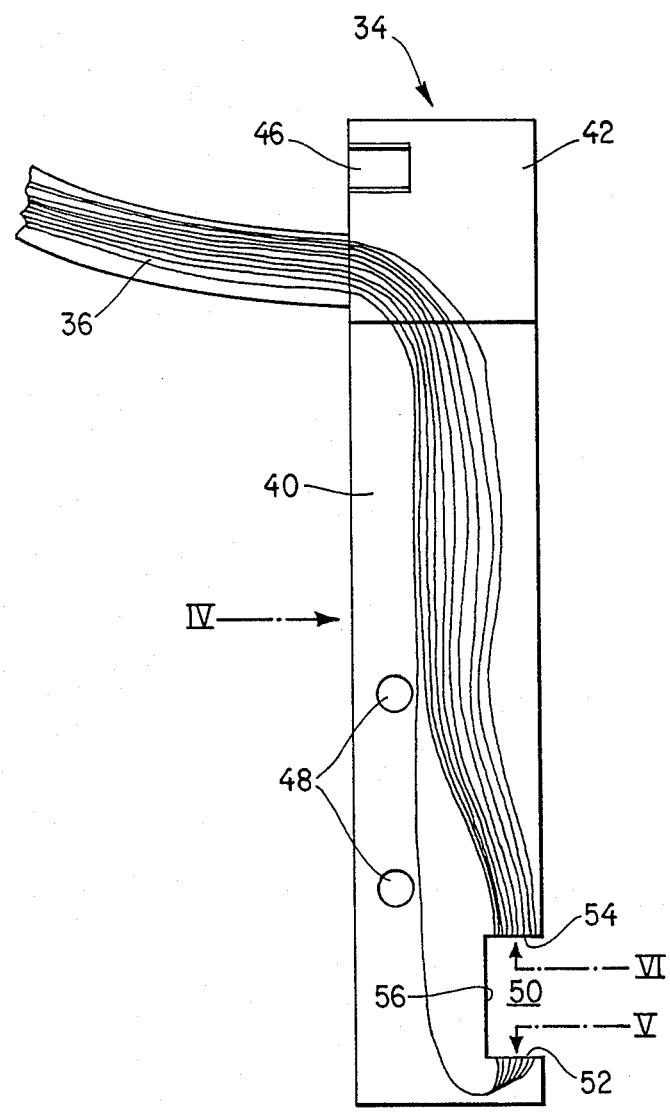
FIG. 3: an enlarged front elevational view of the measuring head.
Figure 4:
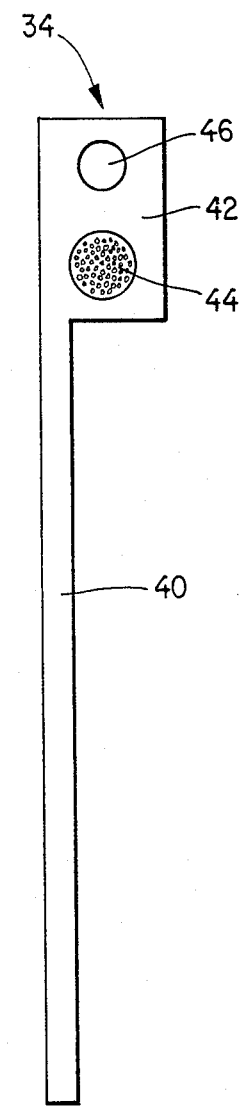
FIG. 4: a side elevational view of the measuring head as seen in the direction of arrow IV in FIG. 3.

Details of the measuring head 34 are shown in FIGS. 3 and 4. The measuring head 34 comprises a flat portion 40 of rectangular outline one end of which is adjacent a parallelepiped extension 42. The light conducting cable 36 enters the latter at 44. The extension 42 is further provided with a tapped blind bore 46 which serves to facilitate the mounting of the measuring head 34 on a rod-shaped stand or the like. Additional fixation points 48 for direct attachment of the measuring head 34 to the nozzle 22 or to the calibrating tool 26 are provided in the region of the flat portion 40.

One side of that end of the flat portion 40 which is remote from the extension 42 is provided with a rectangular recess 50 which imparts to the measuring head 34 a bifurcated shape. Those lateral surfaces in the recess 50 which extend transversely of the longitudinal direction of the flat portion 40 are provided with spaced-apart confronting light emitting and light receiving surfaces 52 and 54. Each of these surfaces is adjacent the ends of a large number of individual elements of the light-conducting cable 36.

The elements of the cable 36 extend from the inlet surface 44 of the housing, through the flat portion 40 and to the light emitting surfaces 52 or light receiving surfaces 54, and they are preferably embedded in the flat portion 40. The elements which terminate at the light emitting surface 52 convey light which they receive from the light sender in the housing 38; such light issues from the ends of the elements in a direction toward the light receiving surface 54. The elements which terminate at the surface 54 receive light and convey it to the light detector in the housing 38. A filter can be installed at a suitable location, preferably immediately ahead of the light detector. Especially if the measurements are carried out with infrared light, the filter can serve to eliminate the influence of daylight, such as fluctuations of the brightness of light in the room and the like which results in a correspondingly increased accuracy of measurement.

Figure 5:
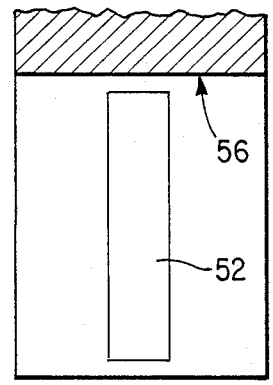
FIG. 5: a light emitting surface of the measuring head as seen in the direction of arrow V in FIG. 3, and FIG. 6: a light receiving surface of the measuring head as seen in the direction of arrow VI in FIG. 3.

FIG. 5 is a plan view of the light emitting surface 52. The latter has an elongated rectangular outline and all parts thereof are in register with ends of light conducting elements.

Figure 6:
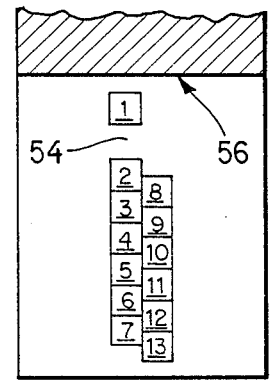

FIG. 6 is a corresponding plan view of the light receiving surface 54. The latter is subdivided into a plurality of discrete fields each of which is a terminal for a plurality of light conducting elements. The fields are square. Adjacent the bottom 56 of the recess 50, there is provided a single field 1 which will be referred to hereinafter as compensation field. The compensation field 1 is colinear with and is spaced apart from one row of fields 2, 3, 4, 5, 6, 7 which are immediately adjacent one another. This row is immediately adjacent a second row of fields 8, 9, 10, 11, 12, 13 which are also immediately adjacent one another and are staggered with reference to the fields 2, 3, 4, 5, 6, 7 by one-half the length of a field. The area of a rectangle which encompasses all of the fields 1 to 13 equals or approximates that of the light emitting surface 52. The light emitting and light receiving surfaces 52 and 54 constitute a light barrier which, during operation, monitors an edge of the extruded product in the region of the swelling of material or in the region of the pileup 32 of material ahead of the calibrating tool 26. The edge is located at the level of the fields 2 to 13 whereas the compensation field 1 is exposed to light whose intensity is not influenced by the material flow. In this manner, one obtains a differential signal which renders it possible to compensate for fluctuations of the intensity of light, for deterioration of the light sender or light detector as a result of aging, for optical absorption by a film which deposits on the light emitting surface 52 or the light receiving surface 54, and so forth.

Based upon the intensity of light which impinges upon the other fields 2 to 13, one obtains a first signal identifying the field at the level of which is located the monitored edge of the extruded product. Due to staggering of the fields 2 to 7 and 8 to 13 relative to each other, the edge is invariably located in the central region of one of these fields. As a rule, one field in each of the two rows of fields 2 to 7 and 8 to 13 is located at the level of the edge of the extruded product. Thus, staggering of the fields renders it possible to achieve a grid-like detection of the position with an accuracy of one-half the length of a field. It is possible to carry out a rapid signal processing because a logic yes/no-signal or a digital signal suffices for identification of the fields. For precision monitoring of the level of the edge of the extruded product, one derives a second signal which is characteristic of the level of the edge of the extruded product within an identified field. Such signal is obtained on the basis of different intensities of light in the light conducting elements which terminate at the respective field.

I claim:

1. Apparatus for regulating the operation of a plant for making an extruded product, particularly of synthetic plastic material, wherein the product issues from an extruding tool and thereupon passes along a predetermined path toward and through a calibrating tool and wherein the material of the product tends to pile up or swell and has at least one edge in said path, comprising a measuring head for contact-free monitoring of the pileup or swelling of the material in said path, including spaced-apart confronting light emitting and light receiving surfaces at opposite sides of said path; and a plurality of light conducting elements having ends adjacent at least said light receiving surface, said light receiving surface having a plurality of fields each adjacent the end of at least one of said light conducting elements, said fields forming a plurality of substantially parallel rows and the fields of said rows being staggered relative to each other, said head being arranged to generate a first signal indentifying at least one field which is adjacent an edge of the material in said path and a second signal denoting the position of such edge with reference to said at least one field.

2. The apparatus of claim 1, wherein said fields have substantially square outlines.

3. The apparatus of claim 1, wherein the fields in at least one of said rows are immediately adjacent each other.

4. The apparatus of claim 1, wherein said rows are adjacent each other.

5. The apparatus of claim 1, wherein the fields of said rows are staggered relative to each other by one-half the length of a field.

6. The apparatus of claim 1, wherein said light receiving surface further comprises a compensation field which is offset from said path so that it is not located at the level of an edge of the material in said path and serves to ascertain a reference level of the intensity of light.

7. The apparatus of claim 1, wherein said light emitting surface has an elongated rectangular outline and an area which equals or approximates the area of said light receiving surface.

* * * * *